United States Patent [19]

Overbury

[11] Patent Number: 4,730,192
[45] Date of Patent: Mar. 8, 1988

[54] MONITOR FOR AN ELECTRONIC TACAN BEACON

[75] Inventor: Francis G. Overbury, Cuffley, England

[73] Assignee: International Standard Electric, New York, N.Y.

[21] Appl. No.: 714,237

[22] Filed: Mar. 21, 1985

[30] Foreign Application Priority Data

Mar. 23, 1984 [GB] United Kingdom ............... 8407605

[51] Int. Cl.$^4$ ............................................. G01S 1/30
[52] U.S. Cl. ................................. 342/399; 342/171
[58] Field of Search ............. 343/399, 404, 406, 378, 343/17.7; 342/171, 173, 174, 47, 49; 364/451

[56] References Cited

U.S. PATENT DOCUMENTS

| | | | |
|---|---|---|---|
| 3,560,978 | 2/1971 | Himmel et al. | 343/399 |
| 3,747,102 | 7/1973 | Cooper | 343/399 |
| 3,940,763 | 2/1976 | Paradise | 342/49 |
| 3,950,753 | 4/1976 | Chisholm | 343/399 |
| 3,997,898 | 12/1976 | LeGrand | 342/47 |
| 4,010,465 | 3/1977 | Dodington et al. | 342/47 |
| 4,014,024 | 3/1977 | Parker et al. | 343/399 |
| 4,074,268 | 2/1978 | Olson | 343/399 |
| 4,207,570 | 6/1980 | Gouley | 343/17.7 |
| 4,454,510 | 6/1984 | Crow | 342/49 |
| 4,506,332 | 3/1985 | Bloch et al. | 343/17.7 |
| 4,583,177 | 4/1986 | Meyer | 342/41 |
| 4,635,060 | 1/1987 | Mertens | 342/173 |

Primary Examiner—Theodore M. Blum
Assistant Examiner—Donald E. Hayes, Jr.
Attorney, Agent, or Firm—Robert A. Walsh; Thomas N. Twomey; Mary C. Werner

[57] ABSTRACT

A monitor for an electronic TACAN (ELTA) includes a 16-way switch whereby samples of the r.f. signal fed to each TACAN antenna element are fed via a common lead 30 to (a) means for r.f. phase correlating the samples with the transmitter generated signals, and (b) means for determining the relative phse and amplitude of the low frequency modulations in the sampled signals.

16 Claims, 5 Drawing Figures

CONTRIBUTIONS RECEIVED FROM 16 ELEMENTS
(AT POINT BETWEEN ANTENNAS 1, 16)

MONITOR FOR AN ELECTRONIC TACAN BEACON

BACKGROUND OF THE INVENTION

This invention relates to a monitor for an electronic TACAN beacon.

A TACAN beacon providing phase measuring bearing information for aircraft, as used since its inception, comprises a mechanically rotated antenna from which are transmitted two amplitude modulated signals of frequency 15Hz and 135Hz respectively. It is known to monitor the performance of a rotating TACAN beacon by means of one or more "far field" monitors, e.g. two diametrically opposed monitors. The field produced by a mechanically rotating antenna is not likely to be subject to directional distortion produced locally at the antenna due to the rigid mechanical devices used for pattern formation.

More recently there has been developed an electronic TACAN (ELTA) beacon in which the rotating field patterns are produced by electronic commutation of a static antenna array Typically such a beacon comprises a circular array of 16 antennae which are driven by e.g. Butler matrix feed circuitry.

The aims of the ELTA monitor are twofold.

Primarily the system is required to ensure that the Tacan pattern which is formed by the new ELTA antenna in the far-field is sufficiently correct so that, as far as is possible, bearing accuracy specification requirements are achieved by all receivers in *all directions* at all times.

Secondly, confidence in high quality far-field performance can only be achieved by an exact analysis of parameters at each antenna separately. Consequently the capability exists, and should be used, for initial setting up procedures. In particular basic mode phasing via logic controlled phase shifters is an essential pre-requisite for establishing coarse and fine pattern alignment in the far-field. Therefore the monitor should also be available as a powerful diagnostic tool.

The far-field pattern in ELTA is formed by the interaction of 4 separate RF components radiating simultaneously from the 16 antenna sub-arrays mounted on a cylindrical structure. The mutual phase relationship between individual antenna excitation and between the separate components themselves is critical. The 4 RF components radiated at any one time are a carrier component, 15 Hz upper and lower sideband components and a single 135 Hz sideband. As shown in FIG. 1 the field at any one point in space is strongly influenced by contributions from at least 10 antennas (11 in the diagram shown are within a range of 12 dB). It would therefore be impossible at that point in the far-field to analyse the received signals in such a way as to reliably identify partial or even complete faults in one of the involved antennas or its feed circuits.

Resulting from the fact that the complete Tacan pattern is formed by the synthesis of many components from a number of antennas the distortion of these components or failure of any of the antennas can generate direction dependent errors in the Tacan field. It is unfortunate that far-field monitors may detect no error in the direction in which they are situated yet quite substantial errors may exist in other directions.

It is felt, therefore, that satisfactory monitoring of ELTA patterns can only be effectively achieved by a close individual analysis of each antenna contribution. This might be considered to be a large, difficult and expensive task but the fundamental simplicity of the mode sequences which constitute the fundamental components of the ELTA pattern reduce the complexity of the problems a great deal. Furthermore the cyclic nature of the basic signal components permits very useful integration periods to be used thus eliminating the need for high precision sampling techniques. Signal-to-noise conditions are ideal and reference components for RF and low frequency are all available, derived from the basic Tacan system control. A valid prediction can be made of the far-field Tacan pattern if all the radiated components which synthesise that pattern can be individually and reliably analysed.

SUMMARY OF THE INVENTION

According to the present invention there is provided a monitor arrangement for an electronic TACAN (ELTA) beacon including means for sampling successively the signals applied to individual elements of the ELTA antenna array, means for r.f. phase correlating said samples with the transmitter generated signals and means for integrating the output of the correlation means.

In a preferred embodiment of the invention the sampling means comprises means for coupling out individually a proportion of the signal feed current to each antenna of the array and commutating switch means whereby the sampled signals are applied successively to the correlation means.

The invention further provides means for determining the relative phase and amplitude of the low frequency modulations in the sampled signals.

BRIEF DESCRIPTION OF THE DRAWINGS

Embodiments of the invention will now be described with reference to FIGS. 1-5 of the accompanying drawings, wherein.

DESCRIPTION OF THE PREFERRED EMBODIMENTS

Sampling of individual antenna element contributions is effected by an integral fixed printed coupler at some point on each antenna element sub-array (not illustrated). From this coupler is extracted a small current component which has a high probability of being representative of the radiated field from that array. Clearly there are factors such as printed board failure or obstruction on the external radome which might affect radiated field without corresponding change to the sampled current. These probabilities are low and consideration should be given to monitoring reflected power from the element for detection of such possibilities.

The use of directional couplers for monitoring antenna feed current as well as providing a means of detecting unduly high reflected currents will, in the forward direction, be less susceptible to components coupled *into* the antenna from adjacent elements It should be remembered, however, that due to the symmetrical nature of phase mode excitation the combined mutual coupling effect from adjacent elements for the used modes tends to be largely self destructive.

Figure 1:
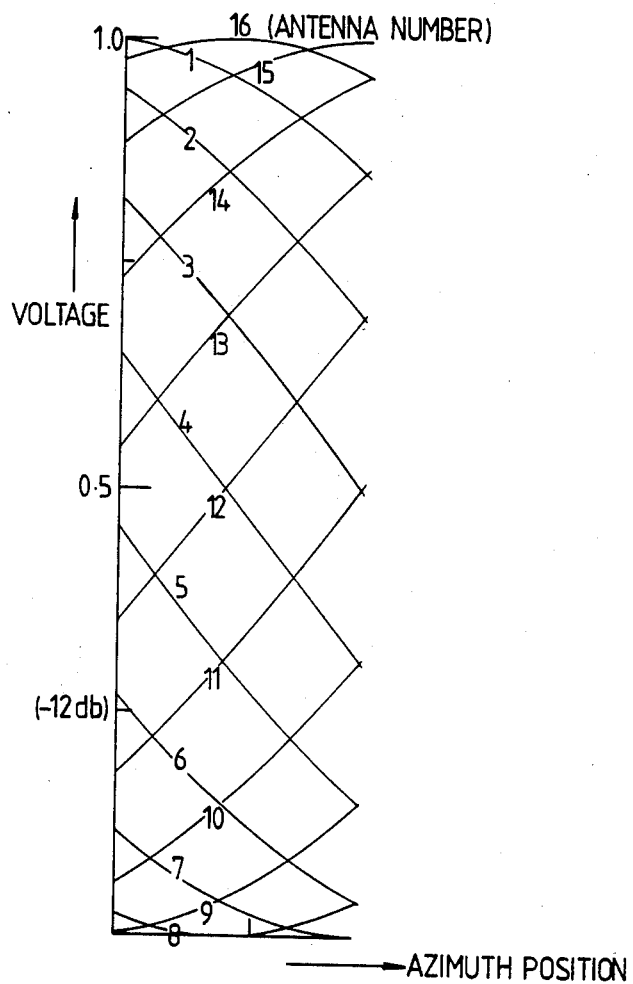
FIG. 1 illustrates antenna field pattern.
Figure 2:
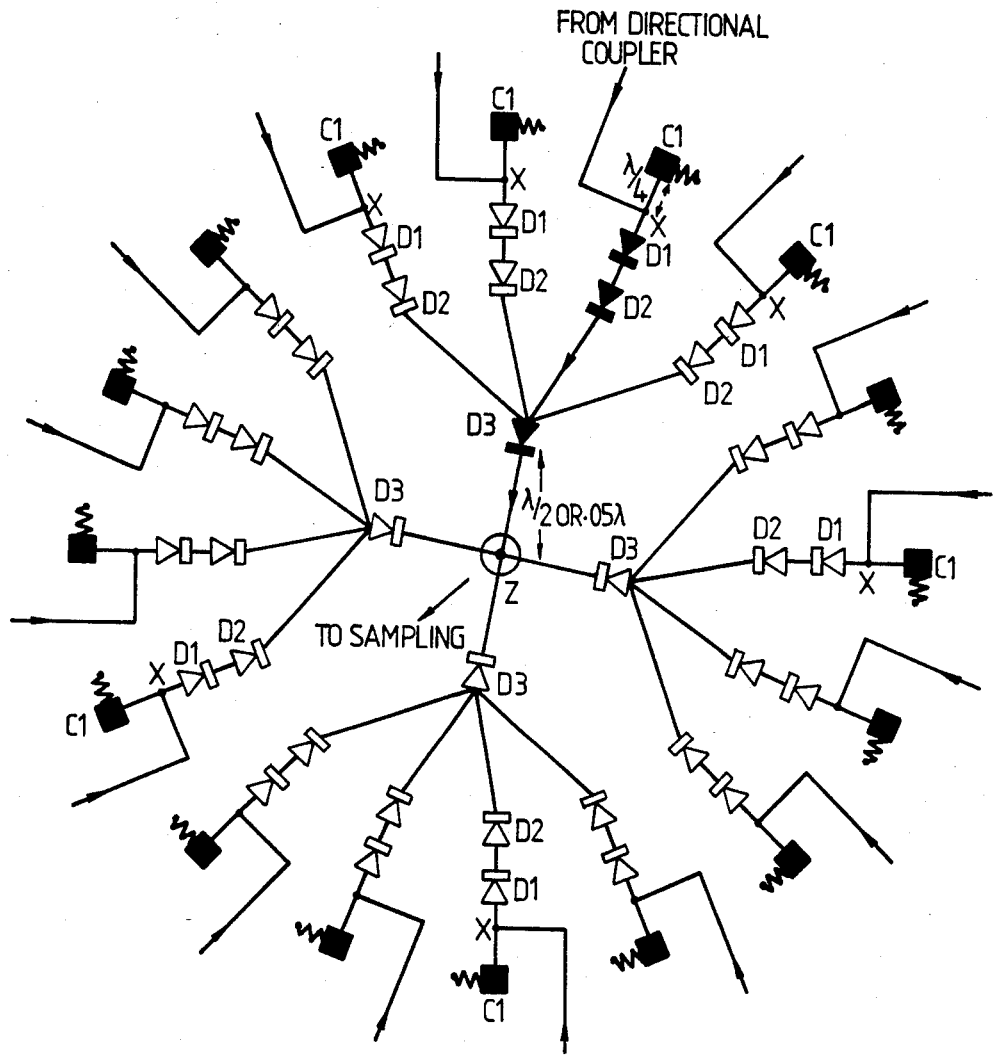
FIG. 2 illustrates a commutating switch structure for sampling the individual antenna feed signals.

The monitor arrangement to be described is configured in two basic units. In the centre of the circular array there is positioned a 16-way switch, FIG. 2. The switch comprises a circuit printed on low loss double sided substrate and uses small glass PIN diodes which are preferably dropped into shaped recesses in the board to minimise discontinuity effects. The circuit has 16 identical branches radially spaced, each branch comprising diodes D1, D2 in series connected to a capacitive patch C1 at the edge of the switch substrate. At a point X intermediate the capacitive patch C1 and the first diode D1 there is a connection to a respective directional coupler (not shown) adjacent a respective antenna of the array (not shown). The 16 branches are connected in four groups each of four branches to common diode D3 at point Y and the four diodes D3 are in turn connected to a common output lead at point Z. The electrical length of the lead from point X in each branch to the respective capacitive patch C1 is $\lambda/4$, where $\lambda$ is the r.f. carrier wavelength. The electrical length of the lead from each group diode D3 to the common output lead at point Z is $\lambda/2$ (or it can be $0.05\lambda$). Branch selection is effected by applying DC at a capacitive patch C1 at the edge of the board. This effectively applies a small switching current to the diodes D1, D2 and D3 rendering the diodes for that branch conducting. This allows the r.f. coupled out from the associated antenna to flow through the branch to the common output lead and thence to the monitor processing circuitry. Isolation to adjacent antenna connections is provided by the diodes in the other branches which are non-conducting at the time. Any "on" branch will see 6 "off" diodes in parallel in its own group of four branches, and this condition applies to all branches giving a substantially fixed VSWR. An advantage of this design of sampling switch is that apart from short cables from individual antenna couplers to the switch all other cables, detectors and measuring circuits are shared by all samples and, as in most cases the measurement of relative phase is of prime importance, the need for careful matching of cables and circuits is avoided. Commutation of the DC switching signal to the capacitive patches can be effected by any suitable commutator.

It is necessary that the radio frequency phase of various components be measurable at the point of propagation. Incoherent (peak riding) detection of the relevant Tacan components at each element will ensure that the relative RF phases at that element are correct but does not monitor overall propagation phase and is less likely to detect bad reflection components off the antenna sub-array due to failure within the assembly. The final far-field pattern must of course rely on the correct individual RF phasing of each element.

Initial alignment of the system requires the establishment of the relative phase of all carrier and sideband components (which are individual phase modes). This requirement clearly demands the ability to measure RF phase at each element. All measurements, in the technique to be described, are referenced to the transmitter. Since all plans are compared to a common source *relative* values measured at each antenna are readily obtainable.

Each of the 16 sub-arrays will have a coupler printed as part of the basic distribution network (not shown). This coupler should basically couple a component $-30$ dB with respect to the main signal and should be directional to reduce the effects of mutual coupling also to permit detection of unusual VSWR conditions if the costs of this is considered acceptable.

The coupler should deliver power in the range (200 divide by 16 divide by 1000) = 12 mW to (5000 divide by 16 divide by 1000) = 312 mW for beacons between 200 to 5000 watts.

Figure 3:
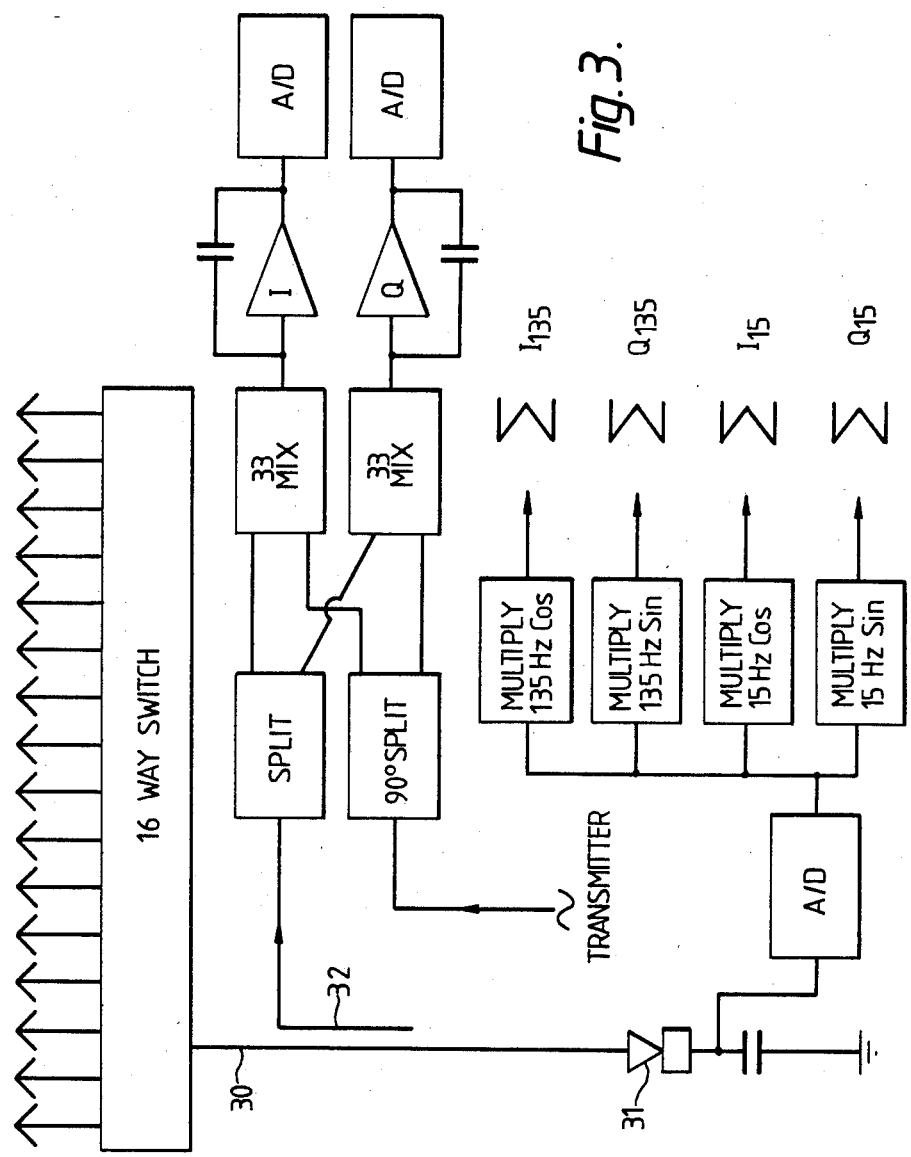
FIG. 3 illustrates the monitor processing arrangements.

All 16 couplers are joined to the 16 way switch, described previously, by equal length cables. It would be expected that the 16 way switch be mounted in the centre of the array assembly facilitating the shortest possible cables where matching is necessary. The output from the switch is joined to a cable bringing the selected sample down to the sampling detectors (FIG. 3). This cable 30 is shared by all samples and is therefore not critical.

A simple attenuator may be placed in this down lead 30 to bring all beacon powers down to that of the 200 watt beacon. For example, it is expected that 4 mW (0.45 volts) would be available for detection by the diode detector 31 in FIG. 3.

A coupler 32 of value $-10$ dB will deliver approximately $-6$ dBm to be split between "I" and "Q" mixers 33. The mixer outputs will have maximum "zero IF" values of about $-17$ dBm which is 30 mV. The coupled out signals are mixed in quadrature with the transmitter signal.

The outputs from each mixer will both have standard Tacan pulse shape but the relative amplitudes Q/I will indicate the instantaneous value Arctan (phase). The amplitude ratio will remain constant throughout the pulse as RF phase is expected to be unchanging. It is not necessary, therefore, to sample the ratio at any precise point in the pulse. This process would require high quality sampling components.

The output from each mixer is integrated over a long period and the relevant integration capacitors will charge to values whose ratio will indicate the "average" RF phase over the integration period. If a single RF component of fixed phase is present throughout the integration period a straightforward result is clearly obtained. If, however, the case of a complete Tacan signal with dominant carrier is considered, then over a period of 1/15 second all sideband components will integrate to zero and the I, Q sums will adopt a ratio which is a true indication of Arctan (carrier phase). It should be added that in practice a switch would probably be inserted between mixer output and integrator. The purpose of this switch would be to isolate the integrator from the mixer during the long (98 per cent) between-pulse period, thus preventing residual DC imbalance components at the mixer from influencing the final QI ration also eliminating discharge of the integrating capacitor when there is no pulse.

Values would be chosen to ensure that the A/D converters operated over the optimum part of their dynamic range for all possible values of I and Q for all possible pulse frequencies. In a monitor system the designer has most parameters under control, in particular the amplitude should be optimised for different power beacons as described earlier.

It has been shown that carrier phase may be measured in the presence of other components provided an integration period of 1/15 sec is allowed. Clearly then this measurement may be made at each antenna during operation and would probably represent a continuous basic propagation phase check to monitor most RF cable faults, Butler matrix failures and antenna sub-array breakdowns. Information as to changes in total transmitted power change can of course be extracted from the pulse integration sums (square root ($I^2+Q^2$)).

Sideband (other phase mode) phases may be established by the same techniques but it would be necessary to turn all other modes off while the measurement was being made. In general it is probably more satisfactory to establish sideband mode phase by measuring modulation phase in the presence of the carrier which has been checked previously.

For operational monitoring it has been shown that it is possible to continuously monitor the propagation phase of the carrier component at each antenna. This in itself will cover many failure mechanisms. Correct Tacan operation is achieved by introducing 135 Hz sideband components and 15 Hz components in the right phase and at the right amplitude. To do this will ensure correct modulation conditions.

In the presence of a dominant carrier signal it is easier to set up and to monitor the presence of smaller sideband components by reference to the modulations which they produce. For setting up they would no doubt be introduced one at a time. In operation the total signal would be examined for 15 Hz and 135 Hz modulation.

An independent "peak riding" analogue detector can be used for the examination of modulation components. Clearly basic RF phase information is lost here, only relative RF phase between signal constituents determines modulation characteristics.

Time constants are selected in the peak riding detector 31 in FIG. 3 such that the detector output achieves the pulse maximum and decays slowly to permit A to D conversion to be made after each pulse by the cheaper range of converters. 4 or 5 microseconds would be available for A to D settling. A simple amplifier would be expected to amplify the small detected signal (0.14 volt peak for 20 per cent modulation depth) to be optimally placed within the range of the A to D converter.

Successive peak amplitudes of all pulses are each to be multiplied (digitally) by the instantaneous value of the reference 15 Hz cosine, 15 Hz sine, 135 Hz cosine and 135 Hz sine. The result of each multiplication is summed over a period of exactly one cycle of 15 Hz and nine cycles of 135 Hz. The appropriate sums $I_{135}$, $Q_{135}$, $I_{15}$, $Q_{15}$ yield 135 Hz and 15 Hz phase and amplitude values of the modulation component at the antenna under examination with respect to the 135 Hz and 15 Hz reference signals generated in the main transmitter.

These values may be derived every 1/15 second, though in the interests of reducing processing speed requirements, samples may be stored for subsequent processing at a reduced data rate.

The use of the LF processing capability may be considered under two main classifications:
1. Continuous monitoring of 15 Hz and 135 Hz phase and modulation depth during operation.
2. Setting up individual zero settings for mode phase shifters under a time/phase compensation technique.

In the second case each individual phase mode would be used separately in the presence of the previously RF checked carrier mode and phasing would be established on the basis of single sideband modulation. Modes not being examined at that time would either be switched off or phase rotated at some high frequency having minimal correlation with 15 Hz or 135 Hz over the measurement period.

Figure 4:
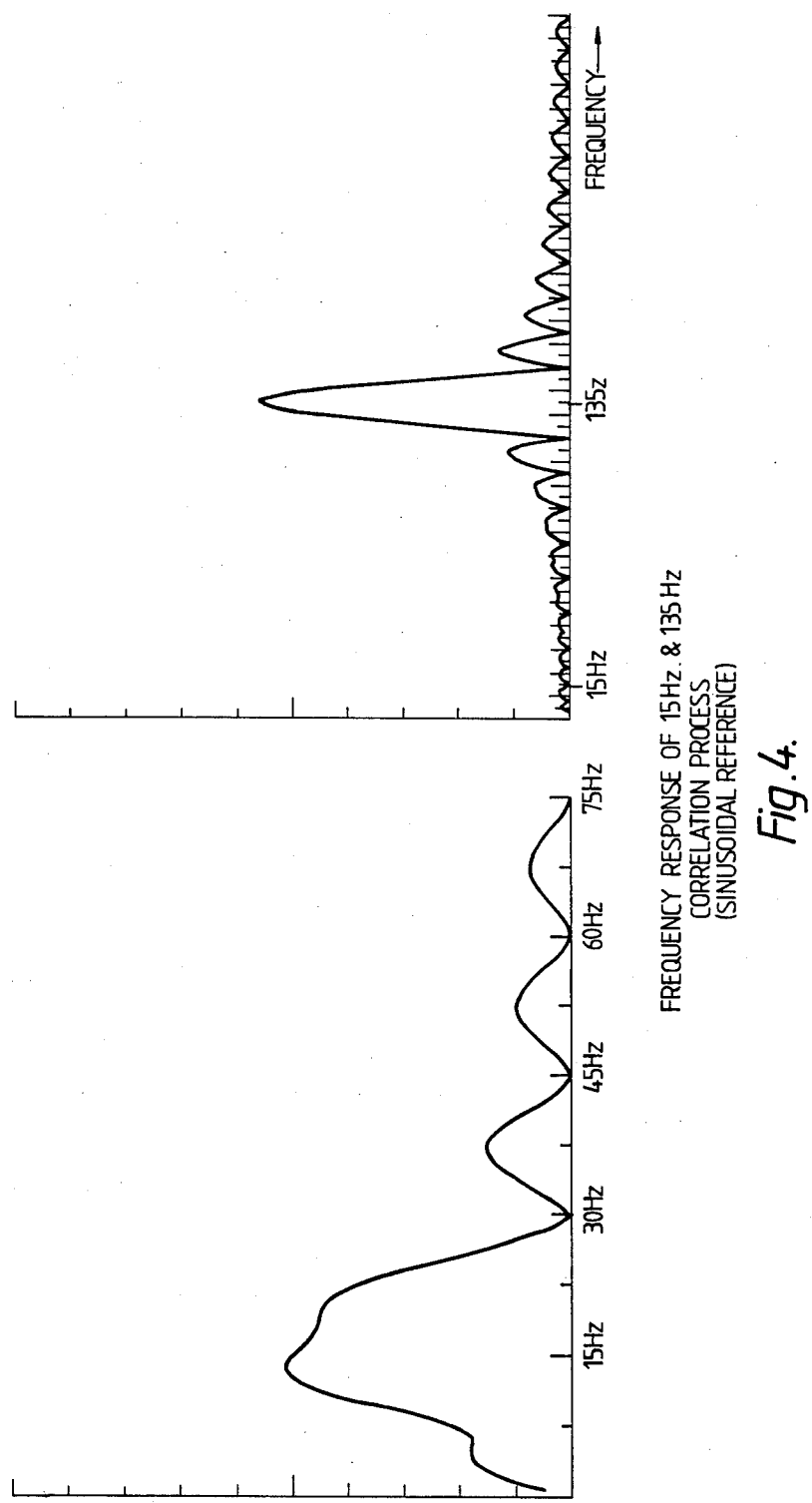
FIG. 4 illustrates frequency response of 15 Hz and 135 Hz correlation process (sinusoidal reference)
Figure 5:
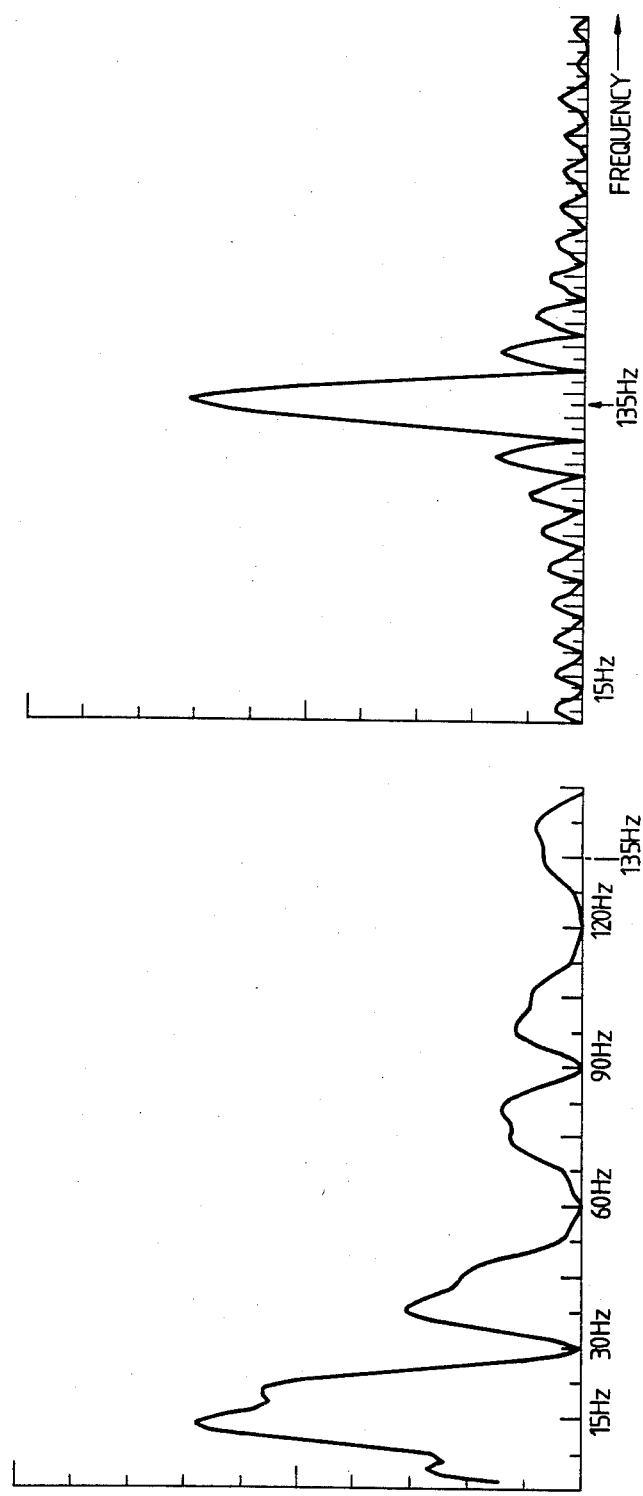
FIG. 5 illustrates frequency response of 15 Hz & 135 Hz correlation process (square wave reference

The process of 15 Hz and 135 Hz phase and amplitude determination is one of correlation with a reference wave and a quadrature reference wave which may be readily available from the main transmitter control logic (not shown). Such a process will of course have some response when frequencies other than the desired are applied. These characteristics are shown in FIGS. 4 and 5. Examination of these curves shows that if a sinusoidal reference is used the response at all harmonics of the desired frequency is zero. This of course includes the 9th harmonic of 15 Hz (135 Hz). If however a square reference wave is used, which would be much simpler to achieve as a look-up table of sine or cosine values could be avoided, the response at odd harmonics is not zero. This unavoidably would mean some interference with the 15 Hz filter by 135 Hz. In the case of the 135 Hz correlation there would be less problem although the effects of harmonic distortion introduced by the detector or by inadequate sampling would be reduced using a sinusoidal reference.

The system does not require high speed sampling. RF phase measurement relies on integration over a 1/15 sec period at the end of which time A to D conversion takes place.

LF analysis does require somewhat more rapid digital sampling though even here 10-15 microseconds can always be available as the peak riding detector holds the voltage of each pulse pair. In order to keep the speed requirements of the microprocessor to a minimum individual samples of the amplitude of the detected wave can be stored with a time reference to permit correct retrieval of 15 and 135 Hz sine and cosine values from a look-up table. The four multiplications and summation necessary for the relevant I and Q values would be done in subsequent time it not being necessary to sample continuously. RF phase indications could be delivered very rapidly after any 1/15 sec integration period. Low frequency phase measurements can easily be achieved in 2/15 second 1/15 for sampling and the next period for correlation plus information usage.

The main purpose of monitoring while the system is in operation is to achieve a high accuracy assessment of all main parameters without interfering with the operation of the system. Parameters must be assessed to such a degree of precision that they may be compared against predetermined standards of merit, that they may be continuously displayed, and where progressive slow deterioration or time or temperature dependent changes occur then pre-warning of possible unacceptable behaviour may be given. In the event of large departure of parameters from initial nominal values then, according to laid down thresholds, alarm and possible switch off signals should be made available.

The parameters monitored by the system would be:
1. Overall phasing at each antenna.
2. Carrier phasing at each antenna.
3. 15 Hz modulation depth and phase measured at each element and external probes.
4. 135 Hz modulation depth and phase measured as above.
5. The existence of reference bursts at the right time.
6. Pulse rates, if required.
7. Pulse shape analysis (but at more expense).
8. 15 Hz, 135 Hz frequency, if required.

I claim:

1. A monitoring apparatus for an electronic Tacan beacon transmitter operating at a given transmitted frequency in which the rotating field patterns are produced by electronic commutation of a static antenna array comprising a plurality of individual antenna elements in a circular array which array generates a far field pattern by having selected groups of said elements in said plurality radiating simultaneously, said monitoring apparatus operative to monitor each antenna element in said array to determine a proper far field pattern comprising:

commutating switch means having a plurality of identical selectable switching paths each separate one associated with one antenna element, with each path coupled to a common output lead and means for selecting any one of said paths to provide an antenna element signal on said common output lead indicative of the radiated field from said associated antenna element;

correlation means coupled to said output lead to provide an I & Q signal according to said transmitted frequency to provide an output indicative of the phase of said transmitted signal over a given period as provided by each of said antenna elements with said output indicative of said far field pattern and whereby a non-operative element can be determined according to said transmitted phase.

2. The monitoring apparatus according to claim 1 further including processing means for determining the relative phase and amplitude of low frequency modulation components in said signal.

3. The monitoring apparatus according to claim 1 wherein said commutating switch means comprises a plurality of identical branches one for each antenna element, with each branch including at least one diode having one electrode coupled to a capacitive patch with the junction between said patch and said electrode coupled to said antenna element, with the other electrode of said diode coupled to a common electrode of an additional group diode to which is connected said other electrode of a given number of adjacent branch diodes to divide said plurality of branches into a distinct number of groups and with the other electrode of said group diode coupled to said output lead.

4. The monitoring apparatus according to claim 3 wherein the are 16 individual antenna elements in said plurality with four groups each containing four distinct antenna elements with four group diodes one for each group having the other electrode of each coupled to said output lead.

5. The monitoring apparatus according to claim 3 wherein said junction between said patch and said diode includes a lead directed from said junction to said patch of a length equal to $\lambda/4$ where $\lambda$ is the transmitted frequency wavelength.

6. The monitoring apparatus according to claim 3 wherein said other electrode of said group diode is coupled to said output lead via a lead path equal to $\lambda/2$ where $\lambda$ is the transmitted frequency wavelength.

7. The monitoring apparatus according to claim 3 wherein said other electrode of said group diode is coupled to said output lead via a lead path equal to 0.05 $\lambda$, where $\lambda$ is the transmitted frequency wavelength.

8. The monitoring apparatus according to claim 3 wherein each branch includes first and second PIN diodes in series.

9. The monitoring apparatus according to claim 1 wherein said correlation means includes:

a first mixer having one input responsive to said antenna element signal and a second input responsive to said transmitted signal to provide at an output said I signal, a second mixer in quarature with said first mixer and operating to provide at an output said Q signal;

first and second integrators with said first integrator coupled to the output of said first mixer to provide at an output of said first integrator a signal indicative of the phase of said I signal, with said second integrator coupled to the output of said second mixer to provide at an output of said second integrator a signal indicative of the phase of said Q signal;

analog to digital converter means coupled to the output of said first and second integrators and operative to provide at an output a signal indicative of the phase of said transmitted signal.

10. The monitoring apparatus according to claim 9 wherein each integrator has an integration period of at least 1/15 of a second.

11. The monitoring apparatus according to claim 2 wherein said processing means includes a peak riding detector means coupled to said output lead for providing at an output a signal indicative of the peak amplitude of said antenna element signal analog the digital converter means coupled to said output of said peak detector means for providing a digital signal indicative of said amplitude, multiplier means responsive to said digital signal and a reference signal for providing at an output a multiplied signal containing phase and amplitude information of the modulation components contained in said antenna element signal.

12. The monitoring apparatus according to claim 11 wherein said multiplier means multiplies said digital signal by 15 Hz cosine.

13. The monitoring apparatus according to claim 11 wherein said multiplier means multiplies said digital signal by 15 Hz sine.

14. The monitoring apparatus according to claim 11 wherein said multiplier means multiplies said digital signal by 135 Hz cosine.

15. The monitoring apparatus according to claim 11 wherein said multiplier means multiplies said digital signal by 135 Hz sine.

16. The monitoring apparatus according to claim 11 wherein the result of said multiplication is summed over a period selected according to said reference signal with said period being one cycle of 15 Hz for a 15 Hz reference and nine cycles of 135 Hz for a 135 Hz reference.

* * * * *